(12) United States Patent
Van Den Berg

(10) Patent No.: US 9,854,780 B2
(45) Date of Patent: Jan. 2, 2018

(54) SYSTEM FOR CONNECTING A TEAT CUP

(75) Inventor: Karel Van Den Berg, Bleskensgraaf (NL)

(73) Assignee: LELY PATENT N.V., Maassluis (NL)

( * ) Notice: Subject to any disclaimer, the term of this patent is extended or adjusted under 35 U.S.C. 154(b) by 582 days.

(21) Appl. No.: 13/045,573

(22) Filed: Mar. 11, 2011

(65) Prior Publication Data

US 2011/0155067 A1    Jun. 30, 2011

Related U.S. Application Data

(63) Continuation of application No. PCT/NL2009/000162, filed on Aug. 24, 2009.

(30) Foreign Application Priority Data

Sep. 15, 2008  (NL) .................................. 1035935

(51) Int. Cl.
  *A01J 5/017*  (2006.01)
  *A01J 5/00*  (2006.01)
  *A01J 5/08*  (2006.01)

(52) U.S. Cl.
  CPC ............... *A01J 5/0175* (2013.01); *A01J 5/08* (2013.01)

(58) Field of Classification Search
  USPC ........................................... 119/14.08
  See application file for complete search history.

(56) References Cited

U.S. PATENT DOCUMENTS

| | | | | |
|---|---|---|---|---|
| 4,223,635 A * | 9/1980 | Akerman | ................ | 119/14.02 |
| 5,450,163 A * | 9/1995 | Iwasaki | ................ | 396/234 |
| 5,666,903 A * | 9/1997 | Bull et al. | ................ | 119/14.01 |
| 5,706,758 A * | 1/1998 | Street et al. | ................ | 119/14.08 |
| 5,918,566 A * | 7/1999 | van den Berg | ................ | 119/14.02 |
| 5,979,359 A * | 11/1999 | Hansson | ................ | 119/14.08 |
| 6,167,838 B1 * | 1/2001 | van den Berg | ................ | 119/14.02 |
| 6,431,116 B1 * | 8/2002 | Nilsson | ................ | 119/14.08 |
| 6,598,560 B1 * | 7/2003 | van den Berg | ................ | 119/14.08 |
| 2006/0196432 A1 * | 9/2006 | Peacock | ................ | 119/14.08 |
| 2008/0257268 A1 * | 10/2008 | Gudmundsson et al. | . | 119/14.08 |
| 2011/0253051 A1 * | 10/2011 | Holmgren et al. | ........ | 119/14.08 |

FOREIGN PATENT DOCUMENTS

| | | |
|---|---|---|
| GB | 2007486 A | 5/1979 |
| WO | 98/11773 A1 | 3/1998 |
| WO | 98/45808 A1 | 10/1998 |
| WO | 2008/030085 A1 | 3/2008 |

OTHER PUBLICATIONS

Hogewerf et al, Computer and Electronics in Agriculture, 6 (1991) 235-242.
International Search Report for PCT/NL2009/000162 (dated Dec. 21, 2009).
NL Search Report for NL 1035935 (dated May 15, 2009).

* cited by examiner

*Primary Examiner* — Marc R Burgess
(74) *Attorney, Agent, or Firm* — Hoyng Rokh Monegier LLP; Ramin Amirsehhi; David P. Owen

(57) ABSTRACT

The invention provides a system for connecting a teat cup to a teat, and a teat cup of this type. A teat cup of this type includes an optical sensor which looks from the inside outwards through the opening of the teat cup. An image of, for example, a teat can thus be produced, and said image can be used very simply to assist a robot arm in guiding the teat cup to the teat.

17 Claims, 1 Drawing Sheet

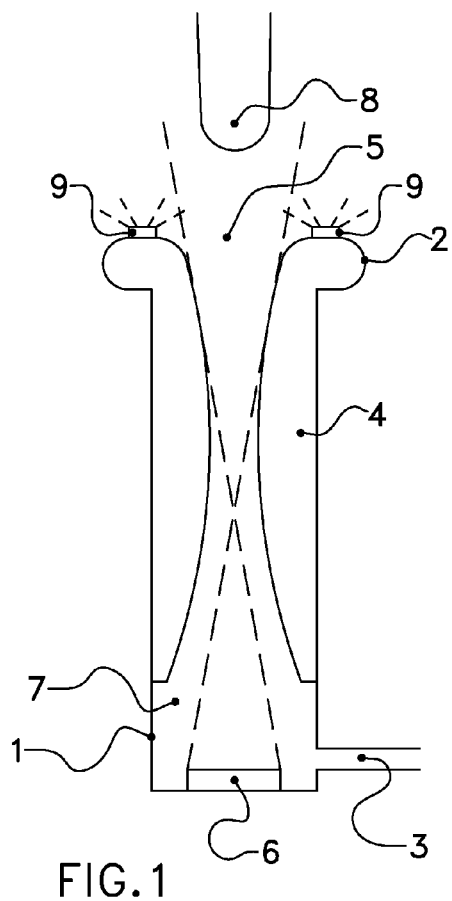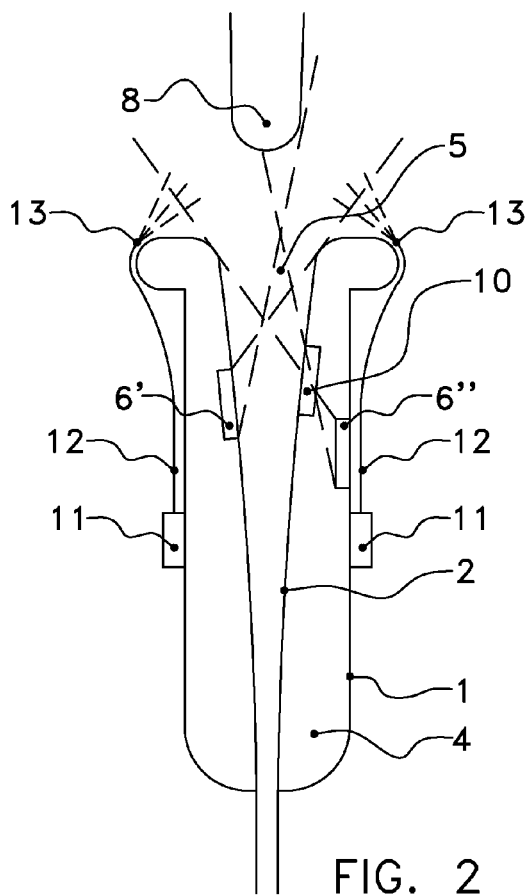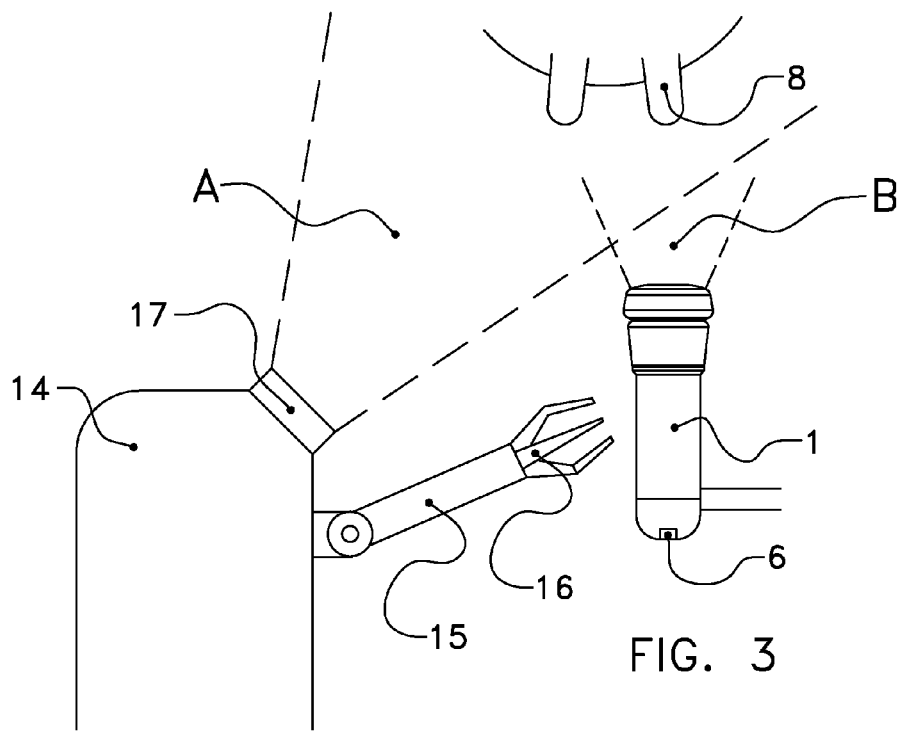

SYSTEM FOR CONNECTING A TEAT CUP

CROSS REFERENCE TO RELATED APPLICATIONS

This application is a continuation of PCT application number PCT/NL2009/000162 filed on Aug. 24, 2009, which claims priority from Netherlands application number 1035935, filed on 15 Sep. 2008. Both applications are hereby incorporated by reference in their entireties.

BACKGROUND OF THE INVENTION

1. Field of the Invention

The invention relates generally to teat cups and more particularly to a teat cup connection system comprising an optical sensor that is configured to form an image of the environment above the teat cup through the opening of the teat cup.

2. Description of the Related Art

In an automatic milking system, for example, these systems comprise a robot arm with teat cups which are to be connected and a teat detection system, such as an ultrasonic or laser detection system.

A disadvantage of the known systems is that they are often undesirably imprecise in determining the position of a teat.

BRIEF SUMMARY OF THE INVENTION

An object of the invention is to provide a teat cup system which suffers less from an imprecision of this type.

The invention achieves this object with a system for connecting a teat cup to a teat, comprising: at least one teat cup with an opening to accommodate a teat; a robot arm, which is configured to move the teat cup; a teat cup positioning system with at least one optical sensor and which is configured to control the robot arm with the aid of the sensor to connect the teat cup, wherein the optical sensor is provided in the teat cup and is configured to form an image of the environment above the teat cup through the opening.

By providing the optical sensor in the teat cup, where it forms an image of the environment through the opening of the teat cup, it is readily capable of producing a usable image of a teat in relation to the teat cup. The invention is based on the notion that, if an image is formed from the position which will ultimately be reached by the teat cup, the distance per se is not so relevant. It suffices in fact to centre a teat in the image, or at least maintain it in a defined position in the image, irrespective of the distance. In contrast, it is necessary in the known systems to measure distances and to ensure that the teat cup is positioned at the same distance from the sensor as the detected teat. The latter is susceptible to distance measurement errors, whereas this is not the case with the present invention.

Here, the description of the "formation of an image of the environment above the teat cup through the opening" means that the image of the environment is formed by the sensor on the basis of the light picked up through the opening. In a manner of speaking, the sensor looks out through the opening.

It should be noted that, in the article entitled 'Equipment for taking video images of teats in dairy farming', by Hogewerf et al, Computer and Electronics in Agriculture, 6 (1991) 235-242, hereby incorporated by reference in its entirety, a system is described with a teat cup containing a ccd camera. However, this is configured to view a teat within the teat cup, and is configured for this purpose on the basis of a matching and fixed focusing distance. This device cannot therefore be used to connect the teat. Similarly, WO98/11773, hereby incorporated by reference in its entirety, describes a system with a teat cup containing viewing means to determine the cleanliness of the teat cup, whereby exclusively the internal area is inspected. A sensor is also disclosed, with the aid of which the teat cup can be connected, but this is exclusively an external sensor, such as an ultrasonic sensor or external camera.

In particular, the optical sensor comprises a camera, more specifically a CCD. These are simple but effective sensors which can produce a clear image of the environment of the teat cup and for which many control programs and other ancillary programs and peripheral equipment also exist. Alternatively, a 3D sensor can be used which collects distance information with the aid of transit times of an optical pulse or with phase shifts of a modulated signal. It should be noted that the matrix of distances also produces an optical image, but then a three-dimensional image with distance information. This is also treated as an image here, for example as the distance information can be reproduced in a 2D image with the aid of artificial colours.

In one embodiment, the teat cup has a centre line and a milk discharge which opens out into the teat cup substantially perpendicular to the centre line, and the optical sensor is provided on or in the base of the teat cup, in particular on the centre line. With a set-up of this type, the outward viewing can implemented in a relatively simple manner for the sensor, and the positioning in relation to the teat simply involves the centring of the teat image. It can be assumed here that the teat is (mostly) light in colour compared with the background, so that the centring simply involves maximizing the brightness of the image, particularly if the sensor can carry out a centre-weighted brightness measurement, as many camera light meters can do. It is also possible, for example, in the case of darker teats, to determine a minimum brightness, or, in short, an extreme in the brightness of the image. In various embodiments, therefore, the at least one optical sensor is configured to recognize an extreme in the brightness of the image, in particular to determine the location of a maximum in the brightness of the image.

Other embodiments of the system comprise a plurality of optical sensors provided in or on a wall of the teat cup, in particular cameras, which look obliquely outwards through the opening. With a set-up of this type, which is less susceptible to infiltrating dirt, stagnating quantities of milk, etc., the total image can be composed, for example, from the partial images. With a preferably symmetrical sensor set-up, the composition is very simple.

In another embodiment, the teat cup positioning device comprises an image recognition device which is configured to recognize a teat, in particular to determine a position of the teat. Image recognition of this type makes the system even more reliable in comparison with (only) brightness recognition.

A particular embodiment of the system according to the invention further comprises at least one light source which is configured to illuminate the environment above the teat cup. This light not only provides support in low ambient light, but can moreover be used as a type of calibrating light source, since the light intensity, the colour, etc. are fully known, so that the sensor can be adjusted accordingly.

In particular, the system comprises one or more LEDs or ends of optical fibres which are attached to an upper edge of the teat cup, in particular of a teat cup liner thereof, or to the outside of the teat cup. LEDs are very compact and can be attached to the teat cup with no functional impairment.

Similarly, optical fibres, such as those made from plastic or glass, are mostly very thin, and they can also be attached on or along the outside of the teat cup liner.

In particular, the system according to the invention furthermore comprises an additional teat detection system. In the system, the teat cup positioning system is preferably configured to control the robot arm to connect the teat cup under the control of the optical sensor and the additional teat detection system. In systems of this type, optimum use can be made of the strengths of the optical sensor in the teat cup and the additional teat detection system. The sensor in the teat cup can in fact very simply and precisely assist the robot in guiding the teat cup to the teat, but the sensor is restricted in terms of field of view, and therefore less suitable for initial situations, for example if the robot is still located at the side of the cow or the like. The additional teat detection system is, for example, readily capable of initiating the positioning of the teat cup from such an initial situation, for example because the field of view is much more suitable for positioning from a side. Once the teat is to some extent usably positioned in relation to the teat cup, the system can further support or take over the positioning with the sensor in the teat cup.

In another embodiment, the additional teat detection system comprises one or more of an ultrasonic scanner, an optical sensor and an animal recognition device. Systems of this type have a wide usable field of view, and are highly suitable for the rough positioning described above. Advantageously, the system also comprises a database with previous teat positions. A rough positioning can also be obtained with this. It should be noted that a teat position database of this type can even be used instead of the additional teat detection system.

The additional teat detection system advantageously also comprises an optical 3D sensor. A 3D sensor of this type is known per se, and comprises an image with distance information, obtained either with "time-of-flight" measurement or through phase shifting of a modulated light signal. 3D sensors of this type are highly suitable for positioning, as they not only determine the required direction of movement, but also indicate the distance over which the teat cup must be moved. However, the distance does not appear to be always correctly indicated in practice, so that the simple and precise sensor set-up according to the invention offers advantages here also.

The invention also relates to a teat cup for use in a system according to the invention, comprising an optical sensor which is provided in the teat cup and which is configured to form an image of the environment above the teat cup through the opening.

The sensor is configured in particular with an optical system which is set to form a sharp image outside the teat cup. The optical system which ensures the image formation of the sensor will be focused on a distance to the outside of the teat cup, in contrast to known systems for images of the inside of the teat cup.

BRIEF DESCRIPTION OF THE DRAWINGS

The following is a description of certain embodiments of the invention, given by way of example only and with reference to the drawings. The features and advantages of the invention will be appreciated upon reference to the following drawings, in which:

FIG. 1 shows highly schematically a cross-section of a teat cup according to the invention, FIG. 2 shows highly schematically an alternative embodiment of the teat cup according to the invention, and FIG. 3 shows highly schematically a system according to the invention.

DESCRIPTION OF ILLUSTRATIVE EMBODIMENTS

FIG. 1 shows highly schematically a cross-section of a teat cup according to the invention. The teat cup 1 has a teat cup liner 2, a milk line 3, a pulse chamber 4 and an opening 5. An optical sensor 6 is provided in a teat cup chamber 7, and forms an image of a teat 8 with the aid of LEDs 9.

In this embodiment, the optical sensor 6, such as a miniature camera, is located at the base of the teat cup chamber 7, through which milk is also transported to the milk line 3. The field of view of the sensor 6, which is indicated by the broken lines, can form an image of the environment above the teat cup 1, through the opening 5. The optical system of the sensor 6, not shown separately, is focused appropriately for this purpose. In another embodiment there is a control device with, for example, an image processing and/or image examination unit presented in detail. One of ordinary skill in the art will know how to implement known control devices, image processing and/or image examination units in the context of the present invention.

The sensor 6 is located at the base of the teat cup 1, on the centre line thereof. The sensor 6 will "look" upwards. During milking, the view of the sensor 6 will be almost nil due to the closure of the teat cup liner 2, as the teat 8 closes off the opening 5, and also in any event due to very regular milk flows. However, on removal of the teat cup 1, the image will usually again be largely visible due to the opening of the teat cup liner 2 and in any event because the majority of the milk will be extracted via the milking vacuum in the teat cup chamber 7. Furthermore, the chamber 7 is frequently rinsed with air or rinsing or cleaning fluid.

In use, the sensor 6 will form an image of the environment. When the teat cup 1 comes into the vicinity of a teat 8, on the basis of earlier teat coordinates, an external control, systematic scanning or the like, the teat will form a clearly recognizable structure in the image, such as a brighter spot, or sometimes even a darker spot, but in fact always a more or less round spot. On the basis thereof, the teat cup 1 can be simply guided towards the teat 8, with, for example, a robot arm control (not shown). The LEDs 9 shown are optional, but are useful for increasing the brightness, and in particular for increasing the contrast. In any case, close objects in particular will be illuminated, so that the top of the teat 8 will form a clear contrast with the less brightly illuminated environment.

FIG. 2 shows highly schematically an alternative embodiment of the teat cup according to the invention. Here, the same reference numbers indicate components of the same type, and for the sake of brevity, detailed explanations will not be repeated.

The teat cup 1 now comprises an optical sensor 6' which is located in the wall of the teat cup liner 2, and an optical sensor 6" which is located in the pulse chamber 4 on the wall of the teat cup 1, behind an optically transparent window 10. LEDs 11, which illuminate optical fibres 12 with exit points 13, are provided as optional ancillary light sources.

The optical sensors 6' and 6" are of course two options, which, in practice, will preferably be of symmetrical design, i.e. two or more identical sensors 6 will preferably be used. The sensor 6' is inserted into the teat cup liner 2, and will thus be less susceptible to (milk) contamination than the sensor 6 in FIG. 1. The optical system of the sensor 6' is preferably configured in such a way that the field of view is primarily directed upwards. See the corresponding broken lines.

The sensor 6" is attached to the internal wall of the teat cup 1, in the pulse chamber 4, and has a field of view indicated by broken lines. As a result, the sensor 6" is itself not susceptible to contamination, but is in fact dependent on the condition of the optical window 10 fitted in the teat cup liner 2. Not only is this window 10 itself in turn susceptible to some extent to contamination, but also, due to its mainly round shape, it may also cause deformation of the image. However, since this is constant, it can be effectively taken into account, particularly in image processing. It should be noted that it is also possible to use an entirely optically transparent teat cup liner 2 of a commercially available type, such as, for example silicone teat cup liners instead of a separate, optically transparent window 10.

In practice, it is not possible for a sensor 6', 6" located in the wall to obtain a central image of the environment above the (opening 5 of the) teat cup 1. For this reason, two or more sensors 6 will preferably be located in the teat cup 1, with fields of view which may or may not overlap. A total image of the environment, such as of the teat 8, can be derived from these fields of view through combination or other processing of the images.

In order to improve the image formation, an additional light source is also optionally provided here, in the form of optical fibres 12, which are illuminated by (for example) LEDs 11 and which irradiate from exit points 13. Other illumination sources are also possible, such as lasers or small (halogen) incandescent lamps. The optical fibres 12 are, for example, PMMA or glass fibres, and these can be attached in, along or on the teat cup 1.

FIG. 3 shows highly schematically a system according to the invention, in particular a system for automatic milking (AMS) of a milking animal, such as a cow. Here, 14 denotes a control of a robot arm 15 with a gripper 16, and with an additional teat detection system 17 with a field of view A. Furthermore, a teat cup 1 is shown with a sensor 6 with a field of view B. In turn, 8 indicates a teat of an udder.

In use, the AMS system will first determine the position of the teat 8 with the aid of the additional teat detection system 17. The teat 8 will be located in the field of view A, which will often be fairly wide. The additional teat detection system 17 may, for example, be an ultrasonic sensor, laser scanner or optical camera with a relatively wide field of view A. It is advantageously a 3D sensor, which can determine not only the intended direction of movement, but also the (rough) distance over which the control 14 must move the robot arm 15 with the gripper 16 and the teat cup 1. The result of this will be that the teat 8 is located following the movement in the field of view B of the sensor 6, whereafter this sensor 6 can assist in the placement of the teat cup 1 on the teat 8, according to steps already described above.

It should also be noted here that, in this system, the robot arm 15 in each case takes a teat cup 1 from, for example, a store and connects it to a teat 8. Alternatively, the robot arm 15 may be provided with, for example, four teat cups 1 which are moved as a set towards the teats 8 and can be connected simultaneously or consecutively thereto.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A system for connecting a teat cup of an automatic milking system to a teat, comprising:
   at least one teat cup having a chamber and an opening to accommodate a teat, wherein the chamber comprises a base through which milk is transported from the teat cup to a milk line;
   a robot arm, which is configured to move the teat cup;
   a teat cup positioning system with at least one optical sensor and which is configured to control the robot arm with the aid of the sensor to connect the teat cup, wherein the optical sensor is provided in the base of the teat cup chamber and is configured to form an image of the environment above the teat cup through the opening.

2. The system according to claim 1, wherein the optical sensor comprises a camera.

3. The system according to claim 1, wherein the optical sensor comprises a CCD camera.

4. The system according to claim 1, wherein the teat cup has a centre line and a milk discharge which opens out in the teat cup essentially perpendicular to the centre line, and wherein the optical sensor is provided on or in the base of the teat cup.

5. The system according to claim 1, wherein the teat cup has a centre line and a milk discharge which opens out in the teat cup essentially perpendicular to the centre line, and wherein the optical sensor is provided on the centre line of the teat cup.

6. The system according to claim 1, wherein the at least one optical sensor is configured to recognize an extreme in a brightness of the image.

7. The system according to claim 6, wherein the at least one optical sensor is configured to determine a location of a maximum in the brightness of the image.

8. The system according to claim 1, wherein the teat cup positioning device comprises an image recognition device which is configured to recognize a teat.

9. The system according to claim 8, wherein the image recognition device is configured to determine a position of the teat.

10. The system according to claim 1, further comprising at least one light source configured to illuminate the environment above the teat cup.

11. The system according to claim 10, comprising one or more LEDs or ends of optical fibres which are attached to at least one of: an upper edge of the teat cup, a teat cup liner of the teat cup, or on the outside of the teat cup.

12. The system according claim 1, further comprising an additional teat detection system.

13. The system according to claim 12, wherein the teat cup positioning system is configured to control the robot arm to connect the teat cup under the control of the optical sensor and the additional teat detection system.

14. The system according to claim 12, wherein the additional teat detection system comprises one or more of: an ultrasonic scanner, an optical sensor and an animal recognition device, and a database with previous teat positions.

15. The system according to claim 12, wherein the additional teat detection system comprises an optical 3D sensor.

16. An automatic milking system teat cup for use in a system according to claim 1, comprising an optical sensor which is provided in the teat cup and is configured to form an image of the environment above the teat cup through the opening.

17. The teat cup according to claim 16, wherein the sensor is configured with an optical system which is set to form a sharp image outside the teat cup.

\* \* \* \* \*